UNITED STATES PATENT OFFICE.

WILLI JEROCH, OF ASCHERSLEBEN, GERMANY.

PROCESS FOR OBTAINING EMULSIONS IN COMBINATION WITH SOLID SUBSTANCES.

1,045,982. Specification of Letters Patent. Patented Dec. 3, 1912.

No Drawing. Application filed February 18, 1911. Serial No. 609,407.

*To all whom it may concern:*

Be it known that I, WILLI JEROCH, a subject of the King of Prussia, and resident of 3ᵃ Graben, Aschersleben, Germany, chemist, have invented a new and useful Process for Obtaining Emulsions in Combination with Solid Substances, of which the following is a specification.

This invention relates to a process for obtaining emulsions in combination with solid substances in such a form as to be suitable for various purposes such for example as preventing dust in streets and the like or as a wood impregnating medium.

For the purpose of abolishing dust in streets, high-roads and the like, the liquors from the manufacture of potash and other processes have recently been used, these liquors being very highly concentrated solutions of hygroscopic salts, such as magnesium-chlorid or calcium-chlorid. Better results however are obtained, if these liquors are used together with oils, tars or similar substances. Thus two kinds of liquors must be handled which do not dissolve in one another, and it is necessary therefore either to spread them separately or to emulsify the oil or tar in order to mix the same with the liquors. Almost all the dust binding media known may be made up into such emulsions, but they have the great disadvantage that large quantities of water must be consigned therewith during transport in cases where water is not obtainable at the destination.

The present invention consists in a process for combining the components oil or tar on the one hand and the hygroscopic salts on the other hand in such a manner that it is unnecessary to transport water therewith for dissolving the salt, the effective constituents of the dust-binding medium, so far as such consists of an oil- or tar salt emulsion being in concentrated form as free as possible from superfluous water. This product when mixed with the necessary amount of water immediately takes again the form of an emulsion for spreading over the desired surface.

This effect can only be incompletely attained however by mere evaporation of such emulsions. A demulsifying of the oil in such case takes place and there is also a loss of oil owing to the volatility of the oil with water vapor. The present invention is based upon the fact that the salts used to bind the dirt, contain a large amount of water of crystallization

$(CaCl_2.6Aq - MgCl_2.6Aq)$, and when employed in calcined form tend to combine again. The process now consists in that so much of an oil or tar emulsion (which may of course contain other salts) is added to the calcined salt of $MgCl_2$ or $CaCl_2$, that sum of the molecules of water present in the emulsion is sufficient for the entire or partial reformation of the crystallized salts. The result is such that after the combining of the constituents the whole mass gradually solidifies and yields a mixture of stable crystallized salts in which the oil is extremely finely divided. It is of course immaterial whether the calcined salt be added to the aqueous emulsion or whether the emulsion be mixed with the powdered salt.

Another method of carrying out the process is based on the use of a double salt of magnesium chlorid and calcium-chlorid, namely the tachydrite

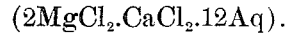
$(2MgCl_2.CaCl_2.12Aq)$.

This contains 12 molecules of water for every three molecules of the salt. On its decomposition, which takes place below 21.4° C. in the presence of water with the formation of $2MgCl_2.6Aq$ and $1CaCl_2.6Aq$, six molecules of water are combined therewith which may be taken from the water of the emulsion. The process however also admits of the use of tachydrite or other double salt of calcium-chlorid and magnesium-chlorid in calcined form. The process may also be used to obtain a wood impregnating medium, for example a combination of zinc-chlorid and tar-oil emulsion. Glue is the only emulsifying medium which may be used for emulsifying the tar-oil or tar with water, when it is intended to combine the emulsion with magnesium-chlorid or calcium-chlorid, as glue is not precipitated by the salt and thus enabling the formation of the emulsion.

The process also presents the advantages that there is saving in freight on transport of the manufactured product. Furthermore, the oil in spite of the difference of its specific weight as compared with that of the heavy salt liquors, cannot separate on the upper surface, as this is prevented by the stable salt. By this means only small quantities of solution require shaking up for the purpose of the emulsion, as the salt-solution does not come into question.

I claim:

1. A process for the manufacture of a solid substance combined with an emulsion and giving an emulsion again on solution in water which consists in mixing a chemical compound, capable of uniting with water to form a substance readily soluble in water, with an emulsion so as to combine and solidify therewith, the amount of water in the emulsion not being greater than that which may combine with the chemical compound.

2. A process for the manufacture of a solid substance combined with an emulsion and giving an emulsion again on solution in water which consists in mixing a dehydrated chemical compound, capable of uniting with water to form a substance readily soluble in water, with an emulsion so as to combine and solidify therewith, the amount of water in the emulsion not being greater than that which may combine with the dehydrated chemical compound.

3. A process for the manufacture of a solid substance combined with an emulsion and giving an emulsion again on solution in water which consists in mixing a partially dehydrated chemical compound, capable of uniting with water to form a substance readily soluble in water, with an emulsion so as to combine and solidify therewith, the amount of water in the emulsion not being greater than that which may combine with the partially dehydrated chemical compound.

4. A process for the manufacture of a solid substance combined with an emulsion and giving an emulsion again on solution in water which consists in mixing a salt, capable of uniting with water to form a substance readily soluble in water, with an emulsion so as to combine and solidify therewith, the amount of water in the emulsion not being greater than that which may combine with the salt.

5. A process for the manufacture of a solid substance combined with an emulsion and giving an emulsion again on solution in water which consists in mixing a double salt, capable of uniting with water to form a substance readily soluble in water, with an emulsion so as to combine and solidify therewith, the amount of water in the emulsion not being greater than that which may combine with the double salt.

6. A process for the manufacture of a solid substance combined with an emulsion and giving an emulsion again on solution in water which consists in mixing partly dehydrated tachydrite, capable of uniting with water to form a substance readily soluble in water, with an emulsion so as to combine and solidify therewith, the amount of water in the emulsion not being greater than that which may combine with the partly dehydrated tachydrite.

7. A process for the manufacture of a solid substance combined with an emulsion and giving an emulsion again on solution in water which consists in mixing dehydrated tachydrite, capable of uniting with water to form a substance readily soluble in water, with an emulsion so as to combine and solidify therewith, the amount of water in the emulsion not being greater than that which may combine with the dehydrated tachydrite.

8. A process for the manufacture of a solid substance combined with an emulsion and giving an emulsion again on solution in water which consists in mixing tachydrite capable of uniting with water to form a substance readily soluble in water, with an emulsion at a temperature of below 21.4° C., so as to combine and solidify therewith, the amount of water in the emulsion not being greater than that which may combine with the tachydrite.

9. A process for the manufacture of a solid substance which, on solution in water, yields an emulsion suitable for impregnating wood, which consists in mixing a chemical compound, capable of uniting with water to form a substance readily soluble in water, with an emulsion of a liquid hydrocarbon, so as to combine and solidify therewith, the amount of water in the emulsion not being greater than that which may combine with the chemical compound.

10. A process for the manufacture of a solid substance which, on solution in water, yields an emulsion suitable for impregnating wood, which consists in mixing a chemical compound, capable of uniting with water to form a substance readily soluble in water, with an emulsion of a tar oil, so as to combine and solidify therewith, the amount of water in the emulsion not being greater than that which may combine with the chemical compound.

11. As a new article of manufacture, a solid substance consisting of a chemical compound in molecular combination with an emulsion, characterized by its property of yielding an emulsion again on solution in water.

12. As a new article of manufacture, a solid substance consisting of a salt in molecular combination with an emulsion, characterized by its property of yielding an emulsion again on solution in water.

13. As a new article of manufacture, a solid substance consisting of a double salt in molecular combination with an emulsion, characterized by its property of yielding an emulsion again on solution in water.

14. As a new article of manufacture, a solid substance consisting of tachydrite in molecular combination with an emulsion, characterized by its property of yielding an emulsion again on solution in water.

15. As a new article of manufacture, a solid substance consisting of a chemical compound in molecular combination with an emulsion of a tar oil, characterized by its property of yielding a tar-oil emulsion again on solution in water.

In witness whereof I have hereunto set my hand in the presence of two witnesses.

WILLI JEROCH.

Witnesses:
   WILHELM GRAMILL,
   CARL REINHOLD.